US012450519B2

United States Patent
Rohrkemper et al.

(10) Patent No.: US 12,450,519 B2
(45) Date of Patent: Oct. 21, 2025

(54) ROOT CAUSE ANALYSIS FOR DETERMINISTIC MACHINE LEARNING MODEL

(71) Applicant: Oracle International Corporation, Redwood Shores, CA (US)

(72) Inventors: James Charles Rohrkemper, Harbor Springs, MI (US); Richard Paul Sonderegger, Dorchester, MA (US); Anna Chystiakova, Sunnyvale, CA (US); Kenneth Paul Baclawski, Waltham, MA (US); Dieter Gawlick, Palo Alto, CA (US); Kenny C. Gross, Escondido, CA (US); Zhen Hua Liu, San Mateo, CA (US); Guang Chao Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1087 days.

(21) Appl. No.: 17/462,592

(22) Filed: Aug. 31, 2021

(65) Prior Publication Data

US 2023/0061280 A1    Mar. 2, 2023

(51) Int. Cl.
*G06N 20/00*    (2019.01)
*G06F 16/242*    (2019.01)

(52) U.S. Cl.
CPC ........... *G06N 20/00* (2019.01); *G06F 16/242* (2019.01)

(58) Field of Classification Search
CPC ............................ G06N 20/00; G06F 16/242
See application file for complete search history.

(56) References Cited

U.S. PATENT DOCUMENTS

| | | | |
|---|---|---|---|
| 6,499,021 B1 | 12/2002 | Abu-Hakima | |
| 10,055,275 B2 | 8/2018 | Razin et al. | |
| 10,275,331 B1 | 4/2019 | Gudka et al. | |
| 11,637,740 B2 | 4/2023 | Sharma et al. | |
| 12,093,253 B2* | 9/2024 | Galitsky | G06N 5/025 |
| 2008/0077547 A1 | 3/2008 | Thurimella | |
| 2009/0228408 A1* | 9/2009 | Kaushal | G06N 5/04 |
| | | | 714/26 |

(Continued)

OTHER PUBLICATIONS

Görtler, Jochen, et al., "Uncertainty-aware principal component analysis," IEEE Transactions on Visualization and Computer Graphics 26.1 (2019): 822-831 (Year: 2019).*

(Continued)

*Primary Examiner* — Shahid K Khan
(74) *Attorney, Agent, or Firm* — Invoke (57) ABSTRACT

Techniques for identifying a root cause of an operational result of a deterministic machine learning model are disclosed. A system applies a deterministic machine learning model to a set of data to generate an operational result, such as a prediction of a "fault" or "no-fault" in the system. The set of data includes signals from multiple different data sources, such as sensors. The system applies an abductive model, generated based on the deterministic machine learning model, to the operational result. The abductive model identifies a particular set of data sources that is associated with the root cause of the operational result. The system generates a human-understandable explanation for the operational result based on the identified root cause.

20 Claims, 5 Drawing Sheets

(56) References Cited

U.S. PATENT DOCUMENTS

| | | | |
|---|---|---|---|
| 2012/0179421 A1* | 7/2012 | Dasgupta | G05B 23/0281 |
| | | | 702/181 |
| 2013/0110761 A1* | 5/2013 | Viswanathan | G06F 16/24578 |
| | | | 706/52 |
| 2014/0163712 A1* | 6/2014 | Waterman | G05B 19/41875 |
| | | | 700/108 |
| 2017/0177546 A1* | 6/2017 | Heinz | G06T 11/206 |
| 2017/0230410 A1 | 8/2017 | Hassanzadeh et al. | |
| 2018/0060151 A1* | 3/2018 | Gross | G06F 21/552 |
| 2018/0122506 A1 | 5/2018 | Grantcharov et al. | |
| 2019/0132190 A1* | 5/2019 | Jeyakumar | H04L 41/0631 |
| 2019/0243799 A1* | 8/2019 | Gross | G06F 18/28 |
| 2019/0250950 A1* | 8/2019 | Huang | G06N 20/00 |
| 2019/0268214 A1 | 8/2019 | Maes et al. | |
| 2019/0286725 A1 | 9/2019 | Gawlick et al. | |
| 2019/0310617 A1* | 10/2019 | Li | G06F 11/008 |
| 2019/0392330 A1* | 12/2019 | Martineau | G06N 3/042 |
| 2020/0021607 A1 | 1/2020 | Muddu et al. | |
| 2020/0184351 A1* | 6/2020 | Wang | G01R 23/20 |
| 2020/0372385 A1* | 11/2020 | Wang | G06F 17/10 |
| 2020/0403991 A1* | 12/2020 | Sohail | H04L 63/1433 |
| 2021/0255917 A1 | 8/2021 | Reitbauer et al. | |
| 2021/0357281 A1* | 11/2021 | Malboubi | G06F 16/285 |
| 2021/0406110 A1* | 12/2021 | Vaid | G06F 18/251 |
| 2023/0061280 A1* | 3/2023 | Rohrkemper | G06N 5/041 |

OTHER PUBLICATIONS

Gross et al., "A supervisory control loop with Prognostics for human-in-the-loop decision support and control applications", 2017 IEEE Conference on Cognitive and Computational Aspects of Situation Management (CogSIMA), Mar. 2017, 7 Pages.

Brito et al., "An Explainable Artificial Intelligence Approach for Unsupervised Fault Detection and Diagnosis in Rotating Machinery", arxiv.org, Cornell University Library, 201 Olin Library Cornell University Ithaca, NY 14853, Feb. 23, 2021, 25 Pages.

Gross et al., "AI Decision Support Prognostics for IoT Asset Health Monitoring, Failure Prediction, Time to Failure", 2019 International Conference On Computational Science and Computational Intelligence (CSCI), IEEE, Dec. 5, 2019, pp. 244-248.

Lundberg et al., "A Unified Approach to Interpreting Model Predictions", arxiv.org, Cornell University Library, 201 Olin Library Cornell University Ithaca, NY 14853, Nov. 25, 2017, 10 Pages.

* cited by examiner

ROOT CAUSE ANALYSIS FOR DETERMINISTIC MACHINE LEARNING MODEL

TECHNICAL FIELD

The present disclosure relates to performing a root cause analysis for results of a deterministic machine learning model. In particular, the present disclosure relates to applying an abductive model to a result of a time-series regression-type deterministic machine learning (ML) model to identify a set of input sources that most influences the deterministic ML model to generate the result.

BACKGROUND

Recently, machine learning (ML) models are used with increasing frequency for a variety of applications. Two types of ML models that have significant differences in how they are trained and how they function are classification-type ML models and regression-type ML models. Classification-type machine learning models are frequently used to classify or label data points. Classification-type ML models include character-recognition models, email classification-type models, models that associate one product with another product (such as associating a wine to be combined with an entrée on a menu), and facial-recognition type models. Regression-type ML models are frequently used to perform prognostics and anomaly discovery. Regression-type ML models are also used to forecast time-series patterns into the future. Regression-type models include neural networks, support vector machines, auto-associative kernel regression-type models, simple linear regression-type models, and multi-variate state estimation technique (MSET) models.

Typically, although a machine learning model may identify an anomaly in a system, the model may have more difficulty identifying a root cause of the anomaly. For classification-type machine learning models, it is relatively easier to identify a root cause of a result than for a regression-type machine learning model.

When a regression-type model generates an early warning of a problem in a system, human experts are required to intervene, to identify devices or sub-systems that are the root cause of the anomaly, and to fix the problem. In systems with many monitored assets, the permutations of possible root causes may be difficult or impossible for a human to investigate successfully in time to identify and address a problem.

Among regression-type ML models, stochastic models—including neural networks and support vector machines—apply probabilistic methods to generate predictions based on input data sets. Probabilistic methods typically are incapable of tracing output alarms back to signal deviations that caused the alarms. For example, the most popular conventional ML algorithms, neural networks (NNs) and support vector machines (SVMs), employ a technique called "stochastic optimization of weights." In practice, running a NN or SVM multiple times with exactly the same input signals results in output signals that slightly differ each time. For that reason, NNs and SVMs are trained by re-running the same data set multiple times (called "epochs") and averaging the results. With enough epochs, the output signals only differ a small amount from a known result against which a model is trained. However, the conventional ML algorithmics that employ stochastic optimization cannot be subjected to a rigorous "propagation of uncertainty" root cause analysis to trace a particular result to a root cause. These stochastic-type ML models cannot explain the reasons, such as the input signal levels of source data sources, that result in the lack of triggering a particular alarm.

Because rigorous propagation-of-uncertainty analyses are not possible for NNs and SVMs, one approach that has been used to estimate relationships between uncertainties on the input signals and the uncertainties on the output signals is called a "black box" approach. In a black box approach, small variations are introduced to input signals and corresponding variations on the output signals are measured. While a "black box" approach provides an estimate of relationships between inputs and outputs, it is not acceptable for safety-critical applications. Using the "black box" approach, it is not possible to prove through analytical propagation-of-uncertainty analyses that there is not some combination of input variations that may cause the "black box" to issue false alarms (which is dangerous for human-in-the-loop applications), or missed alarms (which can have catastrophic consequences).

Similarly, it is not possible to work backward through a "black box"-type analysis to map signal signature characteristics that generated alarms on the output variables to exact signals and signature characteristics on the input signals. In addition, it is impossible to work backwards when no alarm was generated, to determine whether the absence of an alarm on an output signal was either (1) due to the fact that there was no degradation present in any of the input variables, or (2) degradation was present, but masked by the stochastic optimization of weights inherent in the probabilistic ML algorithm.

Since stochastic-type ML models—including neural networks and support vector machines—apply probabilistic methods to generate predictions, they may be inadequate for particularly-sensitive applications. For example, stochastic-type ML models may not be appropriate in applications involving nuclear power generators or real-time medical operations. In addition, it may be difficult to identify a root cause of an output from a stochastic-type ML models since: (1) the models are complex, with multiple hidden layers of neurons, (2) the models are non-linear, and (3) the models rely on an entire data set to arrive at a decision.

In contrast, deterministic-type ML models implement a mathematical structure that, for a given set of input values, will return the same set of output values. As a result, a deterministic-type ML model is reversible. A given set of input values may be determined based on a respective set of output values. In addition, deterministic-type ML models have a relatively low rate of false positives and false negatives relative to stochastic-type ML models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ROOT CAUSE ANALYSIS FOR PARTICULAR OPERATIONAL RESULT OF A DETERMINISTIC MACHINE LEARNING MODEL
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

Regression-type machine learning (ML) models predict operational results of a system based on a given set of input data.

One or more embodiments include identifying a root cause of predicted operational results of regression-type ML models. The regression-type ML model may be a deterministic-type ML model which, for a given set of input values, always returns a same set of output values. A system may identify a root cause of a predicted operational result by generating an abductive model that is a reverse of the deterministic-type ML model.

The system trains the deterministic-type ML model on a set of training data to model non-anomalous operation of a target system. The set of training data may include time-series data. The time series data includes a plurality of signals generated by a plurality of data sources. In one embodiment, the output levels of the plurality of signals in the training data include a range of values that are all non-anomalous values. The deterministic-type ML model is trained using the non-anomalous training data set to model non-anomalous operation of the target system. In one embodiment, the deterministic ML model includes an anomalous-signal-prediction model to identify variations of time-series signals from pre-defined operating parameters. For example, in one embodiment, the deterministic ML model includes a multi-variate state estimation technique (MSET) model.

The system provides a target data set to the deterministic ML model. As a result, the deterministic ML model generates a plurality of operational results based on the values of the target data set. In one embodiment, the deterministic ML model includes a fault detection model that generates the plurality of operational results. For example, the deterministic ML model may include an anomalous-signal-prediction model that generates a set of output values based on the target data set. The set of output values may represent, for each signal of the target data set, a difference between the values of the target data set and a predicted value generated by the anomalous-signal-prediction model. The fault detection model receives the set of output values from the anomalous-signal-prediction model. The fault detection model analyzes the relationships among the output values from the anomalous-signal-prediction model to generate the plurality of operational results. For example, the fault detection model may determine that a particular sub-set of signals having a particular variation from predicted values corresponds to a particular anomaly.

In an embodiment in which the anomalous-signal-prediction model is an MSET model, the fault detection model may be a sequential probability ratio test (SPRT) model. The MSET model may receive as an input target time-series data. The time-series data may include a plurality of signals associated with a plurality of data sources, such as a plurality of sensors monitoring components of a system. The MSET model may generate output values for each signal of the time-series data. The output values correspond to a difference, at a particular point in time, between the value of the respective signal in the target set of time-series data and a value predicted by the MSET model for the particular signal at the particular point in time. The SPRT model receives all the values output from the MSET model. The SPRT model is trained to identify the relationships among the signals that make up the input target time series data. The SPRT model generates operational results based on the values output from the MSET model. For example, if the time-series data includes signals from one hundred sensors, the MSET model may generate output values indicating that ten of the signals are anomalous, or outside pre-defined operating parameters. The SPRT model may identify four of the ten sensors having anomalous values that contribute to a particular anomalous operational result.

The system generates an abductive model to identify, for a particular operational result generated by the deterministic ML model, a root cause of the particular operational result. In one embodiment, the system identifies the root cause based on identifying a set of data sources that have a highest influence on the generation of the particular operational result. In the example in which the SPRT model identifies four of the ten sensors as having the anomalous values that contributed to the particular anomalous operational result, the SPRT model may further identify the remaining six sensors having anomalous values that do not contribute to the particular anomalous result. An abductive model generated based on the SPRT model and the MSET model may receive the particular operational result as an input and may generate identification information of the four sensors as output values.

The system generates the abductive model based on the trained deterministic ML model. For example, in an embodiment in which the deterministic ML model includes an anomalous-signal-prediction model that feeds into a fault-detection model, system utilizes (a) the algorithmic representations of the relationships among the data sources and particular operational results specified by the fault-detection model, and (b) the calculated delta states for the data source signal generated by the anomalous-signal-prediction model to generate the abductive model.

In one embodiment, generating the abductive model includes sequentially varying input values of the signals to the deterministic ML model to identify particular signals that have a greater influence than other signals on generating particular operational results. In an alternative embodiment, generating the abductive model includes varying the input values of the signals to the deterministic ML model in a pre-defined pattern that is non-sequential. In one embodiment, generating the abductive model includes applying propagation-of-uncertainty model to a training data set for training the deterministic ML model to identify the particular signals that have a greater influence than other signals on generating particular operational results.

One or more embodiments include generating an explanation for a particular root cause of a particular operational result. The system may obtain metadata associated with particular signals and data sources. The system may apply the metadata to explanation templates to provide a human-understandable explanation of a root cause of a particular operational result.

In one embodiment, the abductive model may identify a root cause for an operational result that has not been generated by the deterministic ML model. For example, a user may be interested to know why, when three sensors of a system were in an anomalous state, the deterministic model did not generate a particular "failure" operational result. The abductive model may receive as an input a value corresponding to the particular "failure" operational result to identify which data sources would have the greatest influence for causing the deterministic ML model to generate the "failure" operational result.

In one or more embodiments, the deterministic ML model is represented as a structure query language (SQL) aggregation function, and the abductive model is represented as a JavaScript Object Notation (JSON) object.

One or more embodiments described in this Specification and/or recited in the claims may not be included in this General Overview section.

2. Architectural Overview

Figure 1:
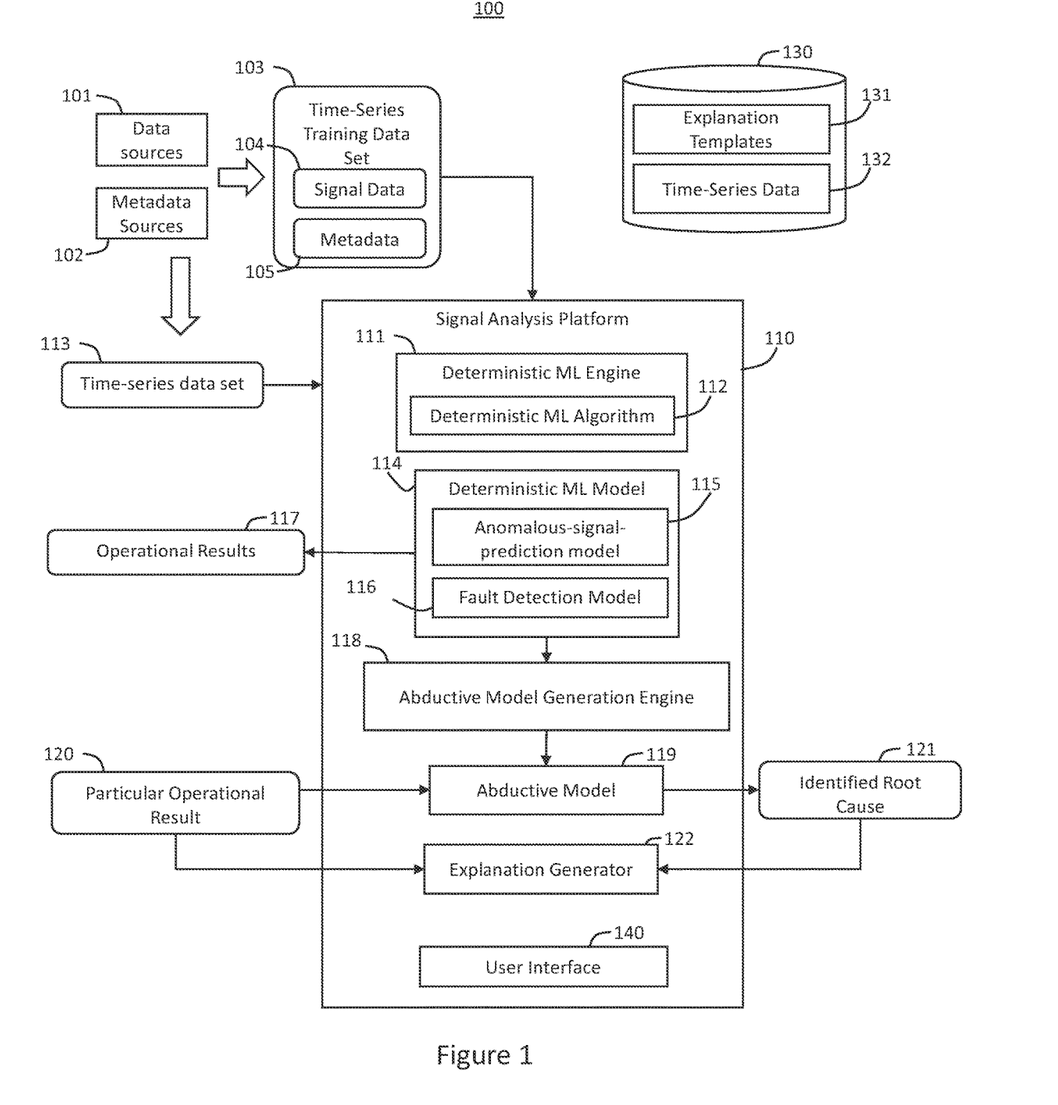
FIG. 1 illustrates a system in accordance with one or more embodiments.

FIG. 1 illustrates a system 100 in accordance with one or more embodiments. As illustrated in FIG. 1, system 100 includes data sources 101, a signal analysis platform 110, and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The signal analysis platform 110 includes a deterministic machine learning (ML) engine 111, an abductive model generation engine 118, and an explanation generator 122. The deterministic ML engine 111 generates a deterministic ML model 114 by applying a deterministic ML algorithm 112 to a time-series data set 103. The time-series training data set includes signal data 104 from data sources 101. In one embodiment, the data sources 101 include sensors monitoring components of a system. For example, the data sources 101 may include sensors and applications monitoring temperatures, environmental conditions, data transmission characteristics, storage characteristics, and application characteristics of a server facility. Alternatively, the data sources 101 may include sensors and application monitoring environmental characteristics, temperatures, tilt, vibration, pressure, and other characteristics of an aircraft. A typical aircraft may include hundreds or thousands of sensors monitoring tens or hundreds of different systems. The data sources 101 may include each of the hundreds or thousands of sensors.

The time-series training data set 103 may also include metadata 105 obtained from metadata sources 102. The metadata sources 102 may include the data sources 101 as well as external sources. For example, a sensor may generate sensor data. The metadata associated with the sensor may include a type of sensor, a model of the sensor, output characteristics of the output data (such as the relationship between a magnitude of the output signal from the sensor and the characteristic being monitored), and a location of the sensor (such as a location in a vehicle, or a geographic location of a site where the sensor is located).

In one embodiment, the time-series training data set is a set of time-series data values for a plurality of signals in a pre-defined operating state. For example, the signals may have varying values that are all non-anomalous values. Using the non-anomalous values for the signal data 104, the deterministic ML engine 111 may train the deterministic ML model 114 to represent a non-anomalous operating state of the system.

In one embodiment, the deterministic ML model 114 includes an anomalous-signal-prediction model 115. The anomalous-signal-prediction model 115 receives a set of data signals as inputs and generates as outputs a corresponding set of values indicating whether the input signals correspond to a signal in an anomalous state. For example, the deterministic ML engine 111 may train the anomalous-signal-prediction model 115 to predict the values of the set of input signals. The anomalous-signal-prediction model 115 may compare the actual values of the input signals with the predictions to generate the corresponding output signals representing a difference between the predictions for the set of input signals and the actual values of the set of input signals.

In one or more embodiments, the deterministic ML model 114 includes a fault detection model 116. The fault detection model 116 receives as an input the signals output by the anomalous-signal prediction model 115. The fault detection model 116 generates values representing operational results 117 for the system. For example, in a target system having a suite of sensors monitoring six different components, the fault detection model 116 may generate values representing faults in one or more of the six different components, or a failure of the entire target system.

The deterministic ML model 114 receives a set of time-series data 113 and generates operational results 117 based on the set of time-series data 113. For example, the deterministic ML model 114 may monitor, in real-time, signals from sensors monitoring a system. Alternatively, the deterministic ML model 114 may be applied to previously-stored time-series data 132. The time-series data 132 may be stored in the data repository 130.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the signal analysis platform 110. Alternatively, or additionally, a data repository 130 may be implemented or executed on a computing system separate from the signal analysis platform 110. A data repository 130 may be communicatively coupled to the signal analysis platform 110 via a direct connection or via a network.

Information describing the time-series data 132 may be implemented across any of components within the system 100. However, this information is illustrated within the data repository 130 for purposes of clarity and explanation.

The signal analysis platform 110 includes an abductive model generation engine 118. The abductive model generation engine 118 receives an input value associated with a particular operational result and generates data identifying a root cause 121 for the particular operational result 120. For example, the abductive model 119 may identify a sub-set of sensors that have a high level of influence on the particular operational result 120. In other words, the abductive model 119 may identify different sets of sensors that, when generating particular output signals, result in the deterministic ML model 114 generating the particular operational result 120. For example, a variation in one set of sensors may be associated with an operational result of a failure of one component in a system. A variation in a different set of sensors may be associated with an operational result of an error state in another component in the system. In one embodiment, the abductive model 119 may identify a component of a system associated with the sub-set of sensors. For example, if the abductive model 119 identifies three sensors monitoring a fuel injector as being associated with an operational result "engine stall," the abductive model may provide as output data: (1) information identifying the sensors, and (2) information identifying the fuel injector. In one embodiment, the signal analysis platform 110 outputs the information associated with the particular sub-set of sensors 121 via a user interface 140.

The signal analysis platform 110 includes an explanation generator 122 for generating a human-understandable explanation of an identified root cause of a particular operational result 120. The explanation generator 122 accesses explanation templates 131 from the data repository 130 and adds information regarding one or both of (1) particular sets of sensors associated with a particular operational result, and (2) particular components in a system associated with the particular sets of sensors. For example, the abductive model 119 may receive a particular operational result, "engine stall" as an input. The abductive model 119 may identify a set of three sensors associated with the fuel injector as being associated with the engine stall. The explanation generator 122 may access a template 131 to generate an explanation "[Fuel injector sensors X, Y, and Z] indicate [a malfunctioning valve] is resulting in an engine stall in engine A." The signal analysis platform 110 may output the explanation via the user interface 140.

In one or more embodiments, interface 140 refers to hardware and/or software configured to facilitate communications between a user and the signal analysis platform 110. Interface 140 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 140 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 140 is specified in one or more other languages, such as Java, C, or C++.

In one or more embodiments, the signal analysis platform 110 refers to hardware and/or software configured to perform operations described herein for identifying a root cause associated with a particular operational result of a deterministic ML model. Examples of operations for identifying a root cause associated with a particular operational result are described below with reference to FIG. 2.

In an embodiment, the signal analysis platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks are described below in Section 5, titled "Computer Networks and Cloud Networks."

Figure 2:
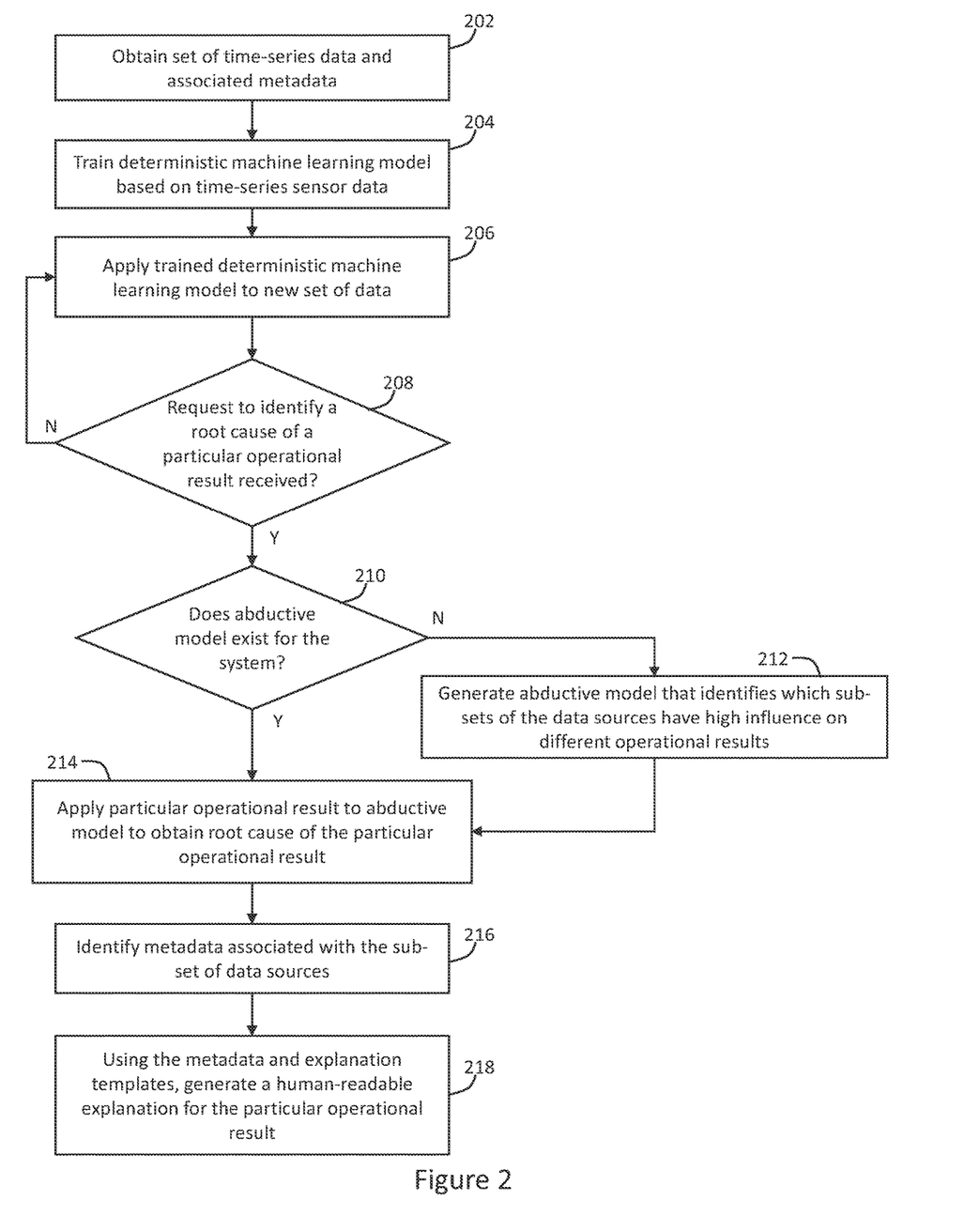
FIG. 2 illustrates an example set of operations for identifying a root cause of an operational result of a deterministic machine learning model in accordance with one or more embodiments.

3. Root Cause Analysis for Particular Operational Result of a Deterministic Machine Learning Model FIG. 2 illustrates an example set of operations for identifying a root cause of a particular operational result of a deterministic machine learning model in accordance with one or more embodiments.

A system obtains a set of time-series data and associated metadata (Operation 202). The time-series data includes time-series signals from a plurality of data sources over a period of time. For example, the time-series data may be sensors values generated by a plurality of sensors over a predetermined period of time. In another example, the time-series data is stored data representing values that sensors would generate. For example, for a set of one hundred sensors, a system may obtain from a manufacturer or other source time-series data representing values that the sensors, if implemented in a system, would generate.

The system trains a deterministic machine learning (ML) model based on a training data set of time-series data (Operation 204). For example, the system may extract from a body of time-series sensor data a representative segment of time-series data in which all the sensor values span a range of values between an upper operating threshold and a lower operating threshold, without passing the thresholds. In other words, the system may select time-series sensor values in which the sensor values are all non-anomalous.

In one embodiment, the deterministic ML model is a regression-type deterministic ML model. In one embodiment, the deterministic ML model includes an anomalous-signal-prediction model and a fault detection model. In one embodiment, the anomalous-signal-prediction model is an MSET model, and the fault detection model is a SPRT model. In one or more embodiments, the deterministic ML model does not include a stochastic-type machine learning model. In one or more embodiments, the deterministic ML model is represented as a structured query language (SQL) aggregation function.

The trained anomalous-signal-prediction model represents the model functioning within pre-defined parameters. For example, the model specifies a range of values, for each signal from a data source, that correspond to a non-anomalous state of the corresponding data source. The trained anomalous-signal-prediction model may generate a prediction, for each actual signal value, of a next signal value. The model may compare the received next actual signal value to the predicted next signal value. The model may output values, for each signal, representing a difference between the predicted next signal value and the actual next signal value.

The trained fault detection model obtains output values from the anomalous-signal-prediction model and identifies relationships (1) among the data sources, and (2) between sets of the data sources and respective operational results. The fault detection model is trained to output a particular operational result based on the particular states of the values obtained from the anomalous-signal-prediction model. In one or more embodiments, the deterministic ML model generates operational results indicating a future fault state of one or more components in a target system even before time-series signals cross threshold operating values.

The system applies the trained deterministic ML model to a new set of time-series data to generate one or more operational results (Operation 206). The new set of time-series data may be: (1) real-time data from sensors or data sources monitoring a system, or (2) previously-stored time-series data to be analyzed by the deterministic ML model. In one embodiment, the operational results include alarms associated with one or more components in a monitored system. The operational results may include predictions of system failures, errors, or other fault conditions in the system that have yet to occur. The trained deterministic ML model may identify patterns in data source signals of time-series data that correspond to potential faults at a later time.

The system determines whether a request has been received to identify a root cause of a particular operational result (Operation 209). For example, a user may generate a request via a user interface of a signal analysis platform. The particular operational result may be either (a) one of the operational results predicted by the system based on time-series data, or (b) a hypothetical operational result that has not been predicted by the system. For example, in an embodiment in which the time-series data includes sensor output signals, an operator may observe that three sensors are operating in an anomalous state, or a state having output levels that exceed pre-defined thresholds. However, the deterministic ML model may determine that the anomalous states of the three sensors will not result in a fault in any component of the system. The operator may initiate a request to identify a root cause of the non-fault state in which three sensors are in an anomalous state. Alternatively, the operator may initiate a request to identify a root cause of a hypothetical fault state. For example, the operator may desire to know which sensors in the system would generate a fault in a cooling component of the system if the sensors were in a fault state. Accordingly, the operator may initiate a root-cause request for a "cooling system" type fault.

Based on receiving the root cause request for a particular operational result, the system determines whether an abductive model exists for the system (Operation 210). For example, the system may generate an abductive model at a time that the deterministic model is generated. Alternatively, the system may generate the abductive model only when a request is received. While the deterministic model is a deductive model that generates predictions of operational results based on a set of time series data, the abductive model generates identification information for a sub-set of data sources, from among the full set of data sources that generate the time-series data. The sub-set of data sources includes the data sources having the greatest influence on determining whether the deterministic model generates the particular operational result. For example, in an embodiment in which the data sources include one hundred sensors monitoring a system, the abductive model may identify a first set of three sensors that, when in an anomalous state, cause a fault state of one component in the system. The abductive model may identify another set of three sensors that, when in an anomalous state, cause a fault state of a different component in the system. The abductive model may identify yet another set of sensors that, regardless of whether they are in an anomalous state or a non-anomalous state, do not have an effect on the fault state of any components in the system.

If no abductive model yet exists, the system generates a new abductive model associates particular sets of data sources with respective operational results (Operation 212). In one embodiment, the system generates the abductive model by taking advantage of the deterministic characteristics of the deterministic ML model. In particular, the system reverses an algorithm associated with the deterministic ML model to identify the particular data sources associated with the respective operational results generated by the deterministic ML model.

In one embodiment, the system generates the abductive model by varying input values to the deterministic ML model according to a pre-defined pattern to identify the data sources that have the greatest influence on the operational results generated by the deterministic ML model. In one embodiment, the pre-defined pattern includes sequentially varying the input values, individually and in combinations. For example, the system may determine that among one hundred sensors monitoring a system, only twenty of the sensors have output values that correspond to particular operational results predicted operational result generated by the deterministic ML model. For example, the system may determine that varying output values of one or more of the twenty data sources to output levels that meet or exceed a threshold level results in the deterministic ML model changing from a non-fault-type operational result to a fault-type operational result. Conversely, the system may determine that varying output values of one or more of the other eighty data sources to output levels that meet or exceed the threshold levels does not result in the deterministic ML model changing an output from a non-fault-type operational result to a fault-type operational result. Instead, the deterministic ML model may continue to generate a non-fault-type operational result.

Once the system has identified the data sources that have the greatest influence on the outputs of the deterministic ML model, the system varies, according to a pre-defined pattern, output values of each of the data sources identified as having the greatest influence on the outputs of the deterministic ML model. Varying the output values of the data sources may include varying the output values of each data source one at a time, as well as grouping the data sources into each possible combination of multiple data sources and varying the output values of each data source in each set of data sources to identify the effect of the variations on the outputs of the deterministic ML model. Once the system has identified which data sources and which sets of data sources correspond to different operational results of the deterministic ML model, the system generates the abductive model to map the data sources, and the sets of data sources, to the respective operational results.

In another embodiment, the system generates the abductive model by applying a propagation-of-uncertainty model to the time-series data to identify the correlations between data sources, and sets of data sources, and different operational results generated by the deterministic ML model.

In one embodiment, the deterministic ML model is represented as an SQL aggregation function. The system may receive the request for the root cause of a particular operational result by receiving an SQL operator. The SQL operator may receive as input data two sets of data. Each set of the two sets may include, for a set of data sources, a delta value between an actual output from the data sources and a predicted value for the data source outputs, the predicted value generated by the deterministic ML model. The SQL operator may return output values representing the differences between the input data sets, as a JSON object.

The system applies a particular operational result to the abductive model to generate a root cause associated with the particular operational result (Operation 214). The abductive model may identify a set of data sources, that is a sub-set of all of the data sources providing output signals that make up the time-series data, that correspond to the particular operational result.

The system obtains metadata associated with the sub-set of data sources (Operation 216). Metadata includes any information associated with the data sources that is not the output signal generated by the data sources. Examples of metadata include: sensor manufacture information, sensor type, sensor operating specifications, sensor output units of measure, a location of a sensor in a monitored system, and a component in the system that is monitored by the sensor.

The system accesses explanation templates from data storage. The system applies the metadata to an explanation template to generate a human-readable explanation for a root cause associated with an operational result (Operation 218). For example, the system may maintain one or more explanation templates for each monitored component in the system. Based on identifying a particular operational result, such as a fault in a component, the system may access the corresponding explanation template from a data store. The system may modify the template based on the particular data sources identified by the abductive model to provide a human-readable explanation of the fault in the component. For example, the system may generate a text output based on an early detection of a fault in a cooling component of a server facility by the deterministic ML model as follows: "A data outage fault is predicted for [server A] due to a [failure] of the [cooling component B]. [Sensors X, Y, and Z] indicate [cooling component B] is operating [near operational parameters] [and is likely to fail]. Recommend replacement of [cooling component B]." In such an example, information contained in the brackets may be generated based on the abductive model identifying the root cause of the predicted fault.

One or more operations illustrated in FIG. 2 may be modified, rearranged, or omitted all together. Accordingly, the particular sequence of operations illustrated in FIG. 2 should not be construed as limiting the scope of one or more embodiments.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
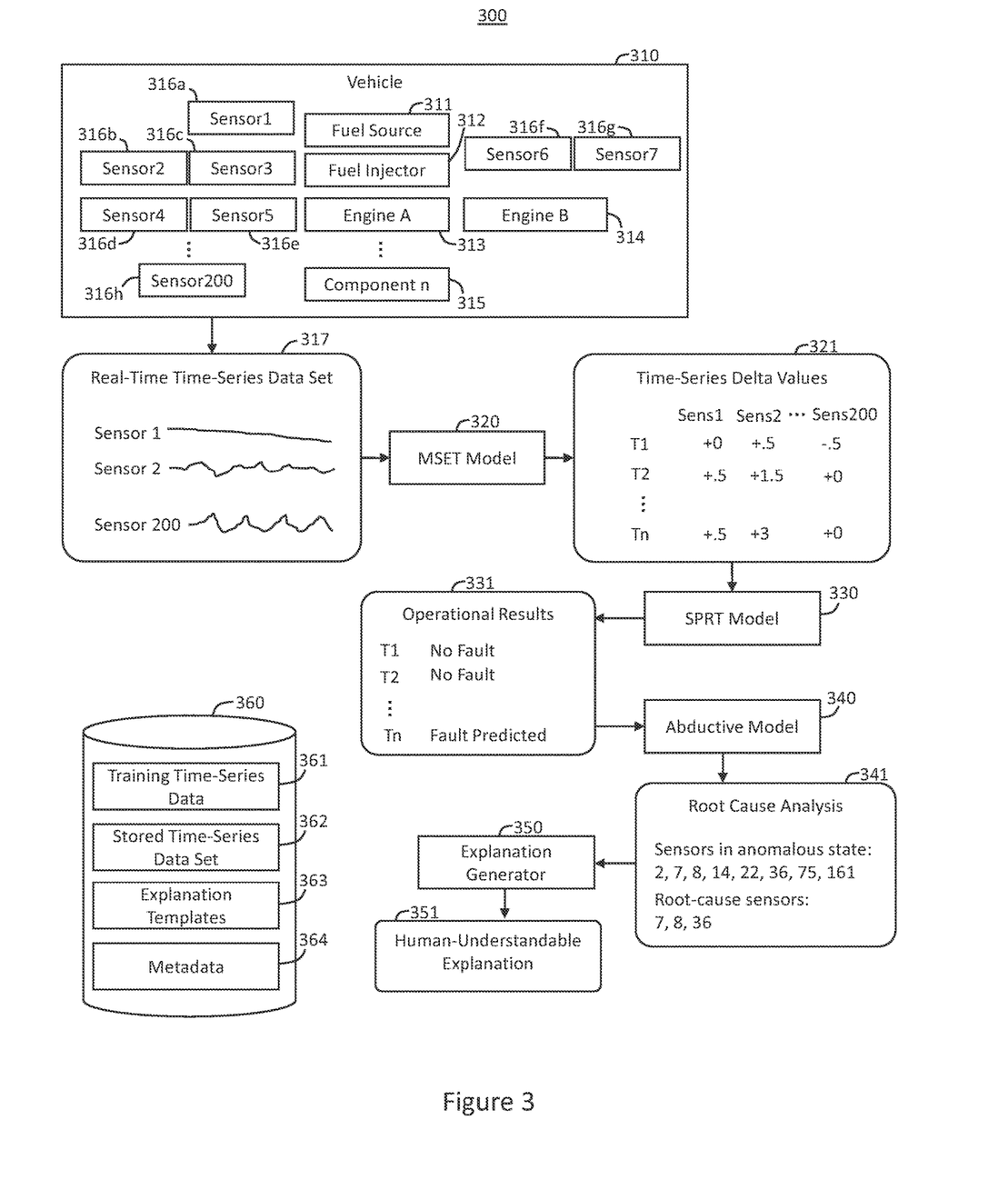
FIG. 3 is an example of a system for monitoring components in a vehicle in accordance with one embodiment.

FIG. 3 illustrates an example of a system 300 according to one embodiment. The system 300 includes a vehicle 310 that is being monitored by a deterministic ML model. The deterministic ML model includes an MSET model 320 and an SPRT model 330. The system includes an abductive model 340 for identifying a root cause of an operational result output by the deterministic ML model. An explanation generator 350 generates a human-readable explanation for the root cause.

In the system 300, the vehicle 310 includes components 311-315. For example, the vehicle 310 may include a fuel source 311, a fuel injector 312, an engine A 313, an engine B 314, and any number of additional components, up to Component n 315. The system 300 may monitor operation of the components 311-315 with sensors 316. Sensor1 316a monitors the fuel source 311. Sensor2 316b and Sensor3 316c monitor the fuel injector 312. Sensor4 316d and Sensor5 316e monitor Engine A 313. Sensor6 316f and Sensor7 316g monitor Engine B 314. Additional sensors monitor additional components in the vehicle, up to Sensor200 316h which monitors Component n 315.

The sensors 316 generate time series data 317. The real-time time-series data set 317 is provided to the MSET model 320 to generate time-series delta values 321. The MSET model 320 may be trained using training time-series data 361 stored in the data repository 360. The training time-series data 361 includes time-series data for each of the sensors 316 in the vehicle 310. The time-series data includes, for each sensor, a range of non-anomalous values. As a result, the MSET model 320 is trained to recognize a range of non-anomalous operating values for the sensors 316 in the vehicle 310. The MSET model 320 generates the time-series delta values 321 based on comparing the non-anomalous operating values predicted by the MSET model 320 with actual values detected in the real-time time-series data set 317. The training time-series data 361 may be generated by actually monitoring the sensors 316 in the vehicle 310 over a duration of time in which the sensors 316 are all in non-anomalous states. Alternatively, the training time-series data 361 may be historical data or template data based on the sensor type and manufacture. For example, a system may maintain a database of known non-anomalous values for a library of sensors. The training time-series data 361 may be generated based on the known non-anomalous values stored in the library.

The MSET model 320 may generate time-series delta values 321 based on the real-time time-series data set 317 or based on a stored time-series data set 362. For example, the stored time-series data set 362 may include one or more sets of time-series data obtained over pre-defined intervals of time. The stored time-series data set 362 may include archives of the real-time time-series data set 317. An operator may model past performance of the system by applying the MSET model to the stored time-series data set 362.

The SPRT model 330 analyses the time-series delta values 321 to generate operational results 331. As illustrated in FIG. 3, the SPRT model 330 determines that for time period T1, the operational result is "no fault" in the vehicle 310. For the time period T2, the operational result is "no fault" in the vehicle 310. For time period Tn, the operational result is "Fault predicted" in the vehicle 310. The abductive model 340 obtains an operational result and generates a root cause analysis 341 for the operational result. The operational result may be among the operational results 331 generated by the SPRT model 330. Alternatively, the operational result may be a hypothetical operational result that was not generated by the SPRT model 330. For example, a user may identify sensor6 316f as being in an anomalous state at time T2 in which no fault was predicted in the system. The user may provide to the abductive model 340 a hypothetical operational result for a "fault predicted in Engine B" to identify particular sensors that would influence whether such a fault is predicted by the deterministic ML model.

The root cause analysis 341 may identify the particular sensors that influence whether a particular operational result is predicted. In the example in FIG. 3, the abductive model 340 identifies sensors 2, 7, 8, 14, 22, 36, 75, and 161 as being in anomalous states, or operating outside pre-defined thresholds. However, based on the abductive model understanding the relationships among the sensors and between the sensors and particular operational results, the abductive model identifies only sensors 7, 8, and 36 as corresponding to the root cause for a particular predicted fault. For example, if the particular predicted fault is a prediction that a component k will fail, the abductive model may identify sensors 7, 8, and 36 as being the sensors with values that most highly correspond to whether component k will or will not fail.

The explanation generator 350 obtains the data from the root cause analysis 341 to generate a human-understandable explanation 351. The explanation generator 350 accesses explanation templates from the data repository 363. The explanation generator 350 also accesses metadata 364 associated with the sensors 316. The metadata 364 provides additional information about the sensors 316, such as sensor type and which component is monitored by which sensors. The explanation generator 350 applies the metadata for the sensors identified in the root cause analysis 341 to the explanation template 363 associated with a particular operational result to generate the human-understandable explanation 351 of the root cause of the particular operational result.

Another detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
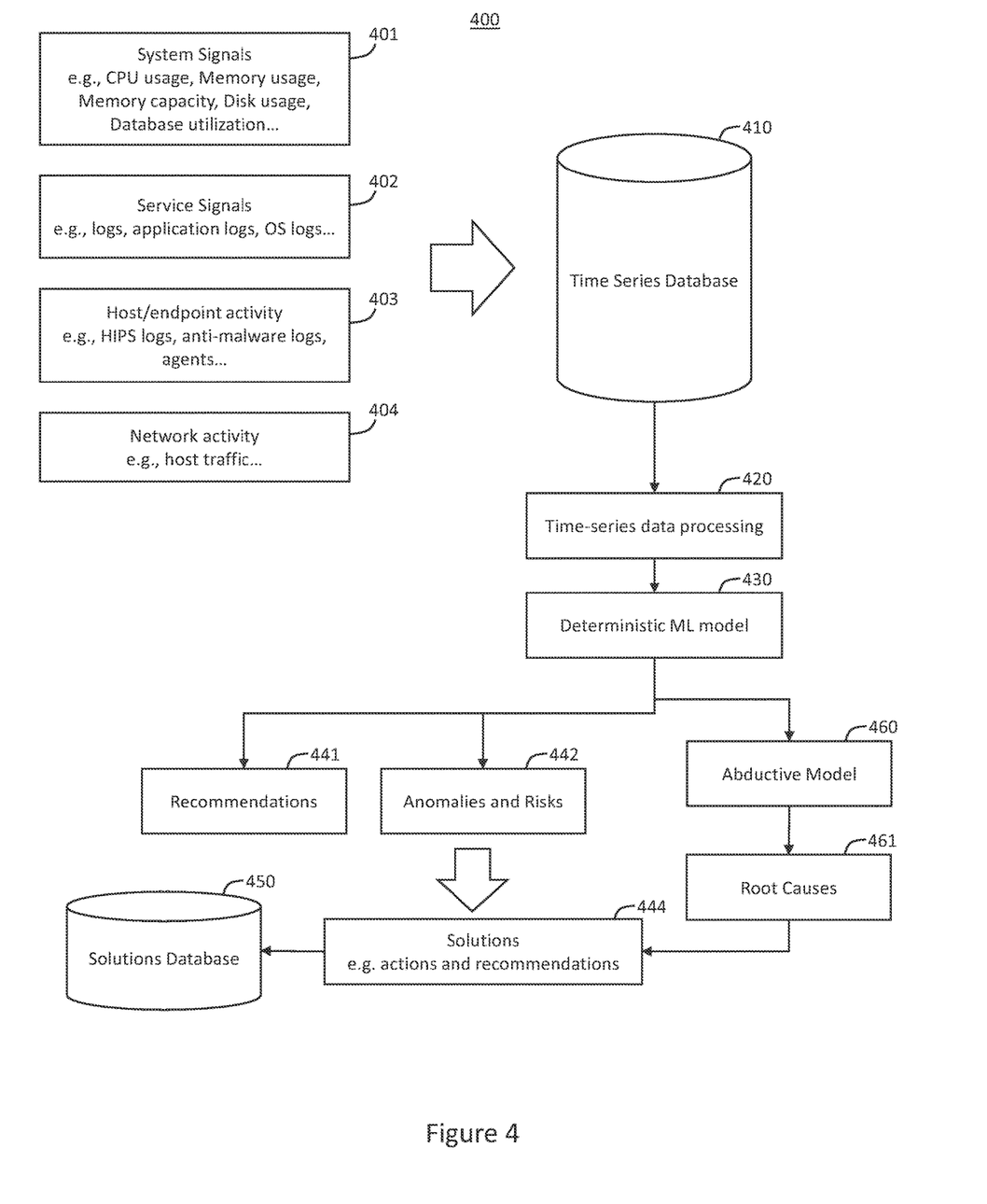
FIG. 4 is an example of a system for monitoring components in a computer system in accordance with one embodiment.

FIG. 4 illustrates an example of a system 400 according to one embodiment. The system 400 includes data sources 401, 402, 403, 404, a time series database 410, a deterministic ML model 430, and a solutions database 450. A computing system monitors various processes to obtain time-series data. The time-series data includes data from system signals 401, including CPU usage, memory usage, memory capacity, disk usage, and database utilization signals. Service signals 402 include various logs, such as application logs and operating system (OS) logs. Host and endpoint activity signals 403 include host intrusion prevention (HIPS) logs, anti-malware logs, and signals of agents executing in the hosts or endpoints. Network activity signals 404 include data tracking host traffic. The various system signals are stored in a time series database 410. The system processes the signals by applying time-series data processing 420. For example, the time-series data may be samples at different sampling rates. In addition, the time-series data signals may be out of synchronization. The system may perform signal processing by: (1) transforming low-resolution signals into high-accuracy signals, (2) matching sampling rates by performing imputation processes to impute missing values in signals, and (3) synchronizing out-of-phase measurements.

The system applies the time-series data to a deterministic ML model 430. The deterministic ML model 430 identifies anomalies in the time-series data and risks to the system and components based on the anomalies 442. For example, the deterministic ML model 430 may identify a set of time-series signal sources that are in anomalous states. The deterministic ML model 430 may further determine that the identified anomalous data sources correspond to a risk of an outage at a host device in the system. Based on the identified anomalies and risks 442, the system may generate one or more recommendations 441. In addition to identifying anomalies and risks 442, the system may identify root causes 461 of particular risks. An abductive model 460 receives the operational results output from the deterministic ML model 430. The abductive model identifies particular data sources that correspond to the root cause 461 of the particular operational results. For example, the deterministic ML model 430 may identify ten data sources in anomalous states. The deterministic model 430 may further identify a risk to a host device from the anomalous states of the ten data sources. However, the deterministic model 430 may not be capable of determining which of the ten data sources is the root cause of the identified risk. The abductive model 460 may identify two of the ten anomalies: e.g., an anomaly in anti-malware logs and an anomaly in CPU usage, as corresponding to the root cause of the risk to the host device. The abductive model 460 may determine that the remaining eight anomalous data sources do not have a direct or significant impact on the identified risk. In one embodiment, the set of possible recommendations 441 is narrowed down based on the identified root causes 461.

Based on the identified root cause 461, the recommendations 441, and the identified anomalies and risks, the system may initiate or propose one or more solutions 444. For example, the system may recommend, based on the risk to the host device, increasing a security setting of a firewall, changing an anti-malware service, or updating an anti-malware application. The system may further generate one or more notifications to a system administrator or host device user with a human-understandable explanation of the root cause and the proposed solution. In one or more embodiments, the system may initiate a solution without intervening user input. The system stores solutions, including recommendations provided and solutions initiated, in a solutions database 450.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
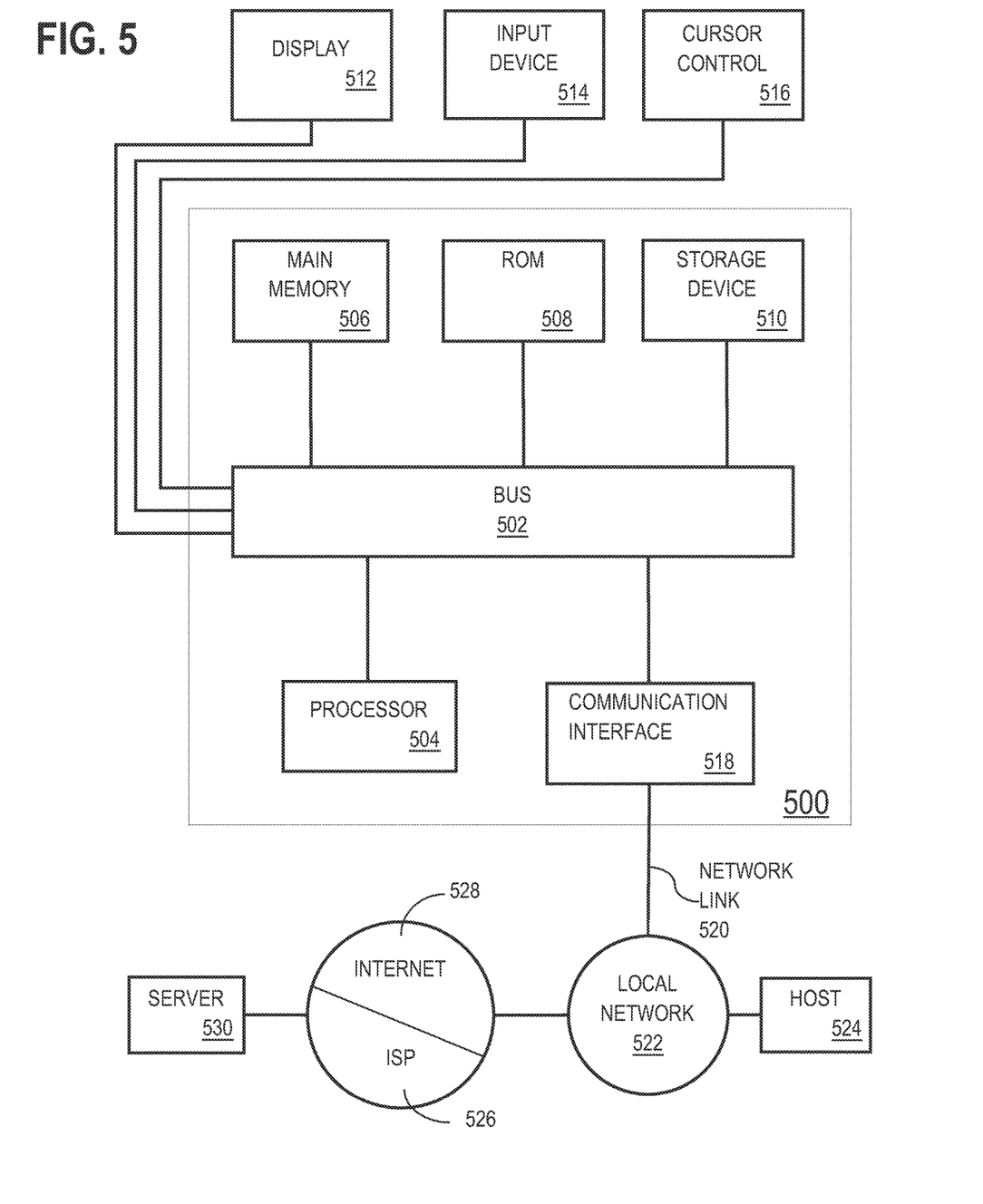
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510.

Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:

training, using a training data set comprising data signals associated with a set of data sources, a deterministic machine learning model to identify anomalous states of the data signals;

using the deterministic machine learning model, analyzing a target data set comprising a plurality of target data signals associated with the set of data sources to generate a plurality of operational results;

based on the plurality of operational results, receiving a root-cause request to identify a root cause of a particular operational result associated with the set of data sources;

generating an abductive model to identify correlations between a plurality of sub-sets of data sources, among the set of data sources, and respective operational results, among the plurality of operational results generated by the deterministic machine learning model, wherein generating the abductive model comprises:

varying, according to a first pre-defined pattern, input values to the deterministic machine learning model to identify a first sub-set of data sources that has a greater influence than a second sub-set of the data sources on determining which operational result is generated by the deterministic machine learning model; and varying, according to a first pre-defined pattern, input values of third sub-sets of the first sub-set of data sources, without varying input values of the second sub-set of the data sources, to identify relative levels of influence of respective data sources on the deterministic machine learning model generating respective operational results; and applying the abductive model to the particular operational result to identify a particular sub-set of the data sources, from among the plurality of sub-sets of data sources, that has a greatest influence on the deterministic machine learning model generating the particular operational result.

2. The computer-readable medium of claim 1, wherein generating the abductive model comprises:

applying a propagation-of-uncertainty model to the training data set to identify the correlations between the plurality of sub-sets of data sources and the plurality of operational results.

3. The computer-readable medium of claim 1, wherein the instructions further cause:
  identifying a particular set of metadata associated with the particular sub-set of the data sources; and
  generating an explanation for the root cause of the particular operational result based on the particular set of metadata.

4. The computer-readable medium of claim 1, wherein the particular operational result is a hypothetical operational result that is not among the plurality of operational results.

5. The computer-readable medium of claim 1, wherein the plurality operational results includes the particular operational result.

6. The computer-readable medium of claim 1, wherein the deterministic machine learning model is represented as a structured query language (SQL) aggregation function, and wherein the abductive model is represented as a JavaScript Object Notation (JSON) object.

7. The computer-readable medium of claim 1, wherein the target data set is a set of time-series data obtained in real-time from the set of data sources, and
  wherein plurality of operational results comprises a plurality of target operational results corresponding to a respective plurality of segments of time of the set of time-series data.

8. A non-transitory computer-readable medium comprising instructions which, when executed by one or more hardware processors, causes performance of operations comprising:
  training, using a training data set comprising data signals associated with a set of data sources, a deterministic machine learning model to identify anomalous states of the data signals;
  using the deterministic machine learning model, analyzing a target data set comprising a plurality of target data signals associated with the set of data sources to generate a plurality of operational results,
    wherein the deterministic machine learning model comprises a multivariate state estimation technique (MSET) model and a sequential probability ratio test (SPRT) fault detection algorithm,
    wherein the MSET model generates a set of output signals identifying anomalous states of the data signals, and
    wherein the SPRT fault detection algorithm generates the plurality of operational results based on the set of output signals generated by the MSET model;
  based on the plurality of operational results, receiving a root-cause request to identify a root cause of a particular operational result associated with the set of data sources;
  generating an abductive model to identify correlations between a plurality of sub-sets of data sources, among the set of data sources, and respective operational results, among the plurality of operational results generated by the deterministic machine learning model; and
  applying the abductive model to the particular operational result to identify a particular sub-set of the data sources, from among the plurality of sub-sets of data sources, that has a greatest influence on the deterministic machine learning model generating the particular operational result,
    wherein the abductive model identifies the particular sub-set of the data sources associated with the plurality of target data signals input to the MSET model based on the particular operational result generated by the SPRT fault detection algorithm.

9. A method comprising:
  training, using a training data set comprising data signals associated with a set of data sources, a deterministic machine learning model to identify anomalous states of the data signals;
  using the deterministic machine learning model, analyzing a target data set comprising a plurality of target data signals associated with the set of data sources to generate a plurality of operational results;
  based on the plurality of operational results, receiving a root-cause request to identify a root cause of a particular operational result associated with the set of data sources;
  generating an abductive model to identify correlations between a plurality of sub-sets of data sources, among the set of data sources, and respective operational results, among the plurality of operational results generated by the deterministic machine learning model, wherein generating the abductive model comprises:
    varying, according to a first pre-defined pattern, input values to the deterministic machine learning model to identify a first sub-set of data sources that has a greater influence than a second sub-set of the data sources on determining which operational result is generated by the deterministic machine learning model; and
    varying, according to a first pre-defined pattern, input values of third sub-sets of the first sub-set of data sources, without varying input values of the second sub-set of the data sources, to identify relative levels of influence of respective data sources on the deterministic machine learning model generating respective operational results; and
  applying the abductive model to the particular operational result to identify a particular sub-set of the data sources, from among the plurality of sub-sets of data sources, that has a greatest influence on the deterministic machine learning model generating the particular operational result.

10. The method of claim 9, wherein generating the abductive model comprises:
  applying a propagation-of-uncertainty model to the training data set to identify the correlations between the plurality of sub-sets of data sources and the plurality of operational results.

11. The method of claim 9, further comprising:
  identifying a particular set of metadata associated with the particular sub-set of the data sources; and
  generating an explanation for the root cause of the particular operational result based on the particular set of metadata.

12. The method of claim 9, wherein the particular operational result is a hypothetical operational result that is not among the plurality of operational results.

13. The method of claim 9, wherein the plurality of operational results includes the particular operational result.

14. The method of claim 9, wherein the deterministic machine learning model is represented as a structured query language (SQL) aggregation function, and
  wherein the abductive model is represented as a JavaScript Object Notation (JSON) object.

15. The method of claim 9, wherein the target data set is a set of time-series data obtained in real-time from the set of data sources, and wherein plurality of operational results comprises a plurality of target operational results corresponding to a respective plurality of segments of time of the set of time-series data.

16. The method of claim 9, wherein the deterministic machine learning model comprises a multivariate state estimation technique (MSET) model and a sequential probability ratio test (SPRT) fault detection algorithm,
  wherein the MSET model generates a set of output signals identifying anomalous states of the data signals,
  wherein the SPRT fault detection algorithm generates the plurality of operational results based on the set of output signals generated by the MSET model, and
  wherein the abductive model identifies the particular sub-set of the data sources associated with the plurality of target data signals input to the MSET model based on the particular operational result generated by the SPRT fault detection algorithm.

17. A system comprising:
one or more processors; and
memory storing instructions that, when executed by the one or more processors, cause the system to perform:
  training, using a training data set comprising data signals associated with a set of data sources, a deterministic machine learning model to identify anomalous states of the data signals;
  using the deterministic machine learning model, analyzing a target data set comprising a plurality of target data signals associated with the set of data sources to generate a plurality of operational results;
  based on the plurality of operational results, receiving a root-cause request to identify a root cause of a particular operational result associated with the set of data sources;
  generating an abductive model to identify correlations between a plurality of sub-sets of data sources, among the set of data sources, and respective operational results, among the plurality of operational results generated by the deterministic machine learning model, wherein generating the abductive model comprises:
    varying, according to a first pre-defined pattern, input values to the deterministic machine learning model to identify a first sub-set of data sources that has a greater influence than a second sub-set of the data sources on determining which operational result is generated by the deterministic machine learning model; and
    varying, according to a first pre-defined pattern, input values of third sub-sets of the first sub-set of data sources, without varying input values of the second sub-set of the data sources, to identify relative levels of influence of respective data sources on the deterministic machine learning model generating respective operational results; and
  applying the abductive model to the particular operational result to identify a particular sub-set of the data sources, from among the plurality of sub-sets of data sources, that has a greatest influence on the deterministic machine learning model generating the particular operational result.

18. A method comprising:
training, using a training data set comprising data signals associated with a set of data sources, a deterministic machine learning model to identify anomalous states of the data signals;
using the deterministic machine learning model, analyzing a target data set comprising a plurality of target data signals associated with the set of data sources to generate a plurality of operational results,
  wherein the deterministic machine learning model comprises a multivariate state estimation technique (MSET) model and a sequential probability ratio test (SPRT) fault detection algorithm,
  wherein the MSET model generates a set of output signals identifying anomalous states of the data signals, and
  wherein the SPRT fault detection algorithm generates the plurality of operational results based on the set of output signals generated by the MSET model;
based on the plurality of operational results, receiving a root-cause request to identify a root cause of a particular operational result associated with the set of data sources;
generating an abductive model to identify correlations between a plurality of sub-sets of data sources, among the set of data sources, and respective operational results, among the plurality of operational results generated by the deterministic machine learning model; and
applying the abductive model to the particular operational result to identify a particular sub-set of the data sources, from among the plurality of sub-sets of data sources, that has a greatest influence on the deterministic machine learning model generating the particular operational result,
  wherein the abductive model identifies the particular sub-set of the data sources associated with the plurality of target data signals input to the MSET model based on the particular operational result generated by the SPRT fault detection algorithm.

19. The method of claim 18, wherein generating the abductive model comprises:
applying a propagation-of-uncertainty model to the training data set to identify the correlations between the plurality of sub-sets of data sources and the plurality of operational results.

20. The method of claim 18, further comprising:
identifying a particular set of metadata associated with the particular sub-set of the data sources; and
generating an explanation for the root cause of the particular operational result based on the particular set of metadata.

* * * * *